3,051,712
Δ³⁻¹⁴-ISODESERPIDIC ACID LACTONE

Georges Muller, Nogent-sur-Marne, France, assignor, by mesne assignments, to Roussel-UCLAF, S.A., Paris, France, a corporation of France
No Drawing. Filed Apr. 11, 1958, Ser. No. 727,783
Claims priority, application France May 22, 1957
4 Claims. (Cl. 260—287)

The present invention relates to a process of synthetically producing deserpidine and selected compounds and, more particularly, to a process of synthetically producing deserpidine and related compounds and new and valuable intermediates isolated in the course of said process, and to such new and valuable intermediate products.

Deserpidine which corresponds to the following Formula I:

(I)

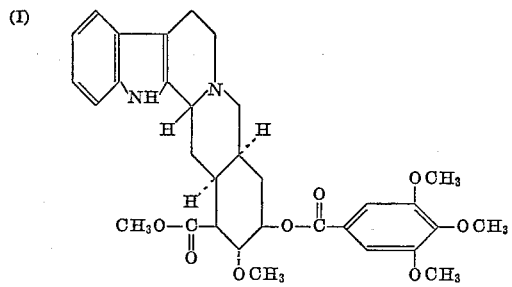

is a Rauwolfia alkaloid. Heretofore, it has been produced solely by extraction from Rauwolfia plants of the genus Rauwolfia. Following the process according to the present invention, deserpidine and related compounds are obtainable in a high yield by a totally synthetic process.

It is one object of the present invention to provide a simple and economic synthetic process of preparing deserpidine and related compounds.

Another object of the present invention is to provide suitable starting materials for the synthesis of deserpidine and related compounds.

Still another object of the present invention is to provide a simple and effective process of producing such new and valuable starting materials for the synthesis of deserpidine and related compounds.

Other objects of the present invention and advantageous features thereof will become apparent as the description proceeds.

In principle, the present invention consists in using as starting material the methyl ester of the levorotatory 1β-carboxy methyl-2β-methoxy carbonyl-3α-methoxy-4β-acetoxy-6β-formyl cyclohexane of Formula II (II)

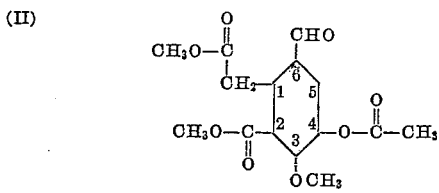

which may be obtained by decomposing the ozonide of the methyl ester of 3β-acetoxy-2α-methoxy-7-oxo-1,2,3,4,4aα,7,8,8aα-octahydronaphthalene-1β-carboxylic acid by means of water or, respectively, in directly oxidizing said ozonide by means of iodic acid or periodic acid. After decomposition of said ozonide by the one or the other method, the resulting product is esterified by means of diazomethane.

The synthetic process of preparing deserpidine and related compounds from said starting material of Formula II according to the present invention makes use of the following derivatives of said acid which have not been described heretofore:

The methyl ester of 18β-acetoxy-17α-methoxy-16β-methoxy carbonyl-(2-3),(3-4)-diseco-Δ⁴,²¹-dehydro-20α-yohimbane-3-carboxylic acid of Formula III:

(III)

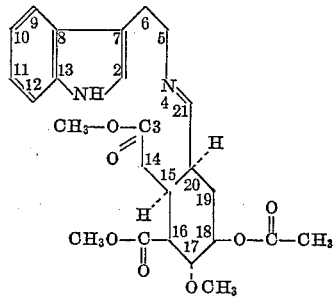

The dextrorotatory 18β-hydroxy-17α-methoxy-16β-carboxy-2,3-seco-3-oxo-20α-yohimbane of Formula IV:

(IV)

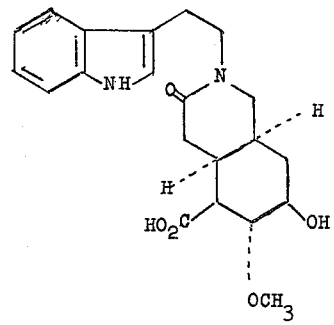

The lactone of the levorotatory 18β-hydroxy-17α-methoxy-16β-carboxy-2,3-seco-3-oxo-20α-yohimbane of Formula V:

(V)

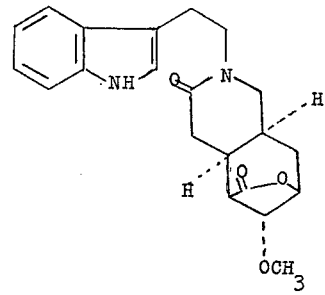

The lactone of the dextrorotatory 18β-hydroxy-17α-methoxy-16β-carboxy-20α-yohimbene-Δ³⁽¹⁴⁾ of the Formula VI:

(VI)

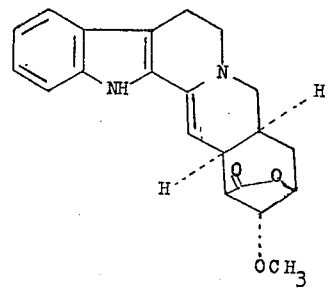

The lactone of the levorotatory 18β-hydroxy-17α- methoxy-16β-carboxy-3β,20α-yohimbane of Formula VII:

(VII)

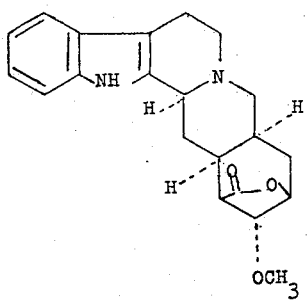

The process according to the present invention which starts with the compound of Formula II and proceeds by way of the compounds of Formulas III, IV, V, and VI, yields as final product the lactone of deserpidic acid of Formula VIII:

(VIII)

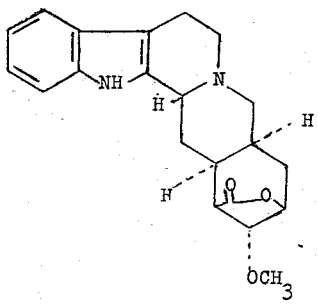

The lactone of deserpidic acid is converted into deserpidine of Formula I in a manner known per se.

The starting material, the methyl ester of 1β-carboxy methyl-2β-methoxy carbonyl-3α-methoxy-4β-acetoxy-6β-formyl cyclohexane of Formula II is condensed with free tryptamine in a neutral solvent, for instance, in tetrahydrofurane. Thereby, the methyl ester of 18β-acetoxy-17α-methoxy-16β-methoxy carbonyl-(2-3),(3-4)-diseco-Δ⁴,²¹-dehydro-20α-yohimbane-3-carboxylic acid of Formula III is obtained. The double bond of this Schiff base is hydrogenated. Saponification and cyclization of the resulting hydrogenated compound yields dextrorotatory 18β-hydroxy-17α-methoxy-16β-carboxy-2,3-seco-3-oxo-20α-yohimbane of Formula IV. Saponification is effected partly already during the reduction of the Schiff base of Formula III when using as reducing agent an alkaline compound such as sodium borohydride or potassium borohydride. The compound of Formula IV is converted into the corresponding lactone of Formula V by means of a lactonizing agent such as acetic acid anhydride. Ring closure of said lactone to the lactone of 18β-hydroxy-17α-methoxy-16β-carboxy-20α-yohimbene-Δ³⁽¹⁴⁾ of Formula VI is achieved by reaction with phosphorus oxychloride or thionylchloride and subsequent treatment with ammonia. The double bond of said lactone of Formula VI is hydrogenated by means of a reducing agent such as zinc powder in the presence of acetic acid thereby yielding the lactone of 18β-hydroxy-17α-methoxy-16β-carboxy-3β,20α-yohimbane of Formula VIII which is identical with the lactone of deserpidic acid. Said lactone of deserpidic acid is contaminated by some amounts of its 3α-isomer which is more soluble in the usual solvents. Therefore, on recrystallization, the desired pure 3β-isomer of Formula VIII is readily obtained. By methanolysis of said compound, the methyl ester of 18β-hydroxy-17α-methoxy-16β-carboxy-3βα,20α-yohimbane of Formula IX (IX)

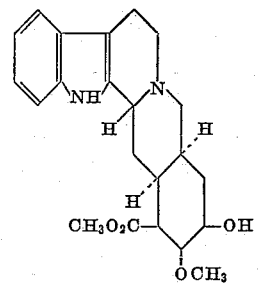

is obtained which is identical with the methyl ester of deserpidic acid described by Schlittler et al., "Journ. Am. Chem. Soc.," vol. 77, page 4335 (1955). Schlittler et al. obtained said ester by using natural deserpidine as starting material. The methyl ester of deserpidic acid is esterified by subjecting it to the action of 3,4,5-trimethoxy benzoylchloride in the presence of a tertiary base, preferably pyridine or methyl ethyl pyridine, whereby deserpidine is obtained.

It is understood that, without departing from the spirit of the present invention, it is possible to use the racemic mixture of isomeric compounds of Formula II as starting material, thus, obtaining the racemic methyl ester of deserpidic acid, and resolving said final compound or a racemic intermediate product of this process. But, of course, this process is rather troublesome and the yield of the racemic reaction products must at least be divided by two when assuming that the yield on resolution of the racemic mixture is quantitative.

Esterification of the methyl ester of deserpidic acid may be effected also by other acids, for instance, by trimethoxy cinnamic acid, thereby yielding compounds related to deserpidine.

The following examples serve to illustrate the present invention without, however, limiting the same thereto. More particularly, the reaction temperature, the solvents used, and the ring forming agents, lactonizing agents, or reducing agents employed may be varied in accordance with the principles set forth herein and in the claims annexed hereto.

The melting points given in the examples are points of instantaneous melting determined on the Maquenne block.

EXAMPLE 1

Preparation of the Crude Methyl Ester of Levorotatory 1β-Carboxy Methyl-2-β-Methoxy Carbonyl-3α-Methoxy-4β-Acetoxy-6β-Formyl Cyclohexane (Formula II)

17.8 g. of levorotatory 1β-carboxy methyl-2α-methoxy carbonyl-3α methoxy-4β-acetoxy-6β-formyl cyclohexane are dissolved in 148 cc. of absolutely dry ether. After cooling the solution to 0° C., a solution of diazomethane in methylene chloride is slowly added thereto with stirring, thereby keeping the temperature at about 0° C. Sufficient diazomethane is added so that a yellow color of the solution indicates a slight excess of diazomethane. After allowing the mixture to stand for about 10 minutes at the reaction temperature, the solvents are distilled off in a vacuum. The resulting crude methyl ester of 1β-carboxy methyl-2β-methoxy carbonyl-3α-methoxy-4β-acetoxy-6β-formyl cyclohexane can directly be used for condensation with tryptamine.

EXAMPLE 2

Preparation of the Methyl Ester of 18β-Acetoxy-17α-Methoxy-16β-Methoxy Carbonyl-(2-3),(3,4)-Diseco-Δ⁴,²¹-Dehydro-20α-Yohimbane-3-Carboxylic Acid (Formula III)

10 g. of commercial tryptamine hydrochloride are dissolved in 60 cc. of hot water. A solution of ammonium hydroxide is added thereto to adjust the pH-value of the solution to a pH of 9.0. The solution is extracted by means of methylene chloride. The extract is dried over magnesium sulfate, filtered, and evaporated to dryness. The residue which consists of free tryptamine is dissolved in boiling benzene and is caused to crystallize by the addition of petroleum ether. After standing for some time, the crystals are filtered with suction. 7.4 g. of free tryptamine of a melting point of 115° C. are recovered. They are dissolved in 10 parts by volume, i.e. 75 cc. of tetrahydrofurane. The methyl ester obtained according to Example 1 and dissolved in 37 cc. of tetrahydrofurane is mixed with the tryptamine solution. The reaction mixture is allowed to stand at room temperature for one hour and the solvent is distilled off in a vacuum. The resinous evaporation residue which consists of the crude methyl ester of 18β-acetoxy-17α-methoxy-16β-methoxy carbonyl-(2-3), (3,4) - diseco - $\Delta^{4,21}$ - dehydro-20α-yohimbane-3-carboxylic acid can directly be used for the reduction step.

EXAMPLE 3

*Preparation of Dextrorotatory 18β-Hydroxy-17α-Methoxy-16β-Carboxy-2,3-Seco-3-Oxo-20α-Yohimbane (Formula IV)*

All the ester obtained according to Example 2 is dissolved in 148 cc. of water-free methanol. 3.7 g. of potassium borohydride are added thereto. After allowing the mixture to stand for 10 minutes at 20° C., the solution is boiled under reflux for 5 minutes. 3.7 cc. of acetic acid are added. The mixture is then poured into a mixture of 110 cc. of water and 59 cc. of 10 N sodium hydroxide solution. Refluxing is continued for 15 minutes to complete saponification. The reaction mixture is acidified by the addition of concentrated hydrochloric acid to a pH of 1.0. The mixture is cooled by allowing it to stand at room temperature. Thereby, the final product crystallizes. After standing overnight, the crystals are filtered with suction. 16.25 g. (91% of the theoretical amount) of dextrorotatory 18β-hydroxy-17α-methoxy-16β-carboxy-2,3 - seco-3-oxo-20α-yohimbane are obtained. The compound which is sufficiently pure for use in the next reaction step melts at 155° C. and has a specific rotary power of $[\alpha]_D^{20}=+27°$ (concentration: 0.5% in ethanol).

For analysis, the product is recrystallized from acetone. Its rotatory power does not change. Its melting point is 160–165° C. The compound is slightly soluble in acetone and alcohol, soluble in alkaline solutions. The compound is hygroscopic.

*Analysis.*—$C_{21}H_{26}O_6N_2=386.43$: Calculated, 63.54% C; 6.83% H; 23.70% O; 5.93% N. Found, 63.8% C; 6.7% H; 23.60% O; 6.0% N.

This compound has not yet been described in the literature.

EXAMPLE 4

*Preparation of the Lactone of 18β-Hydroxy-17α-Methoxy-16β-Carboxy-2,3-Seco-3-Oxo-20α-Yohimbane (Formula V)*

16.15 g. of the crude yohimbane compound prepared according to Example 3 having a melting point of 155° C., are mixed with 160 cc. of acetic acid, 160 cc. of acetic acid anhydride, and 8 g. of lithium acetate. As soon as a clear solution is obtained, the mixture is heated at 80° C. for 2 hours. 160 cc. of water are added. After allowing the solution to stand at room temperature for one hour, the reaction mixture is poured on ice and neutralized by the addition of an ammonium hydroxide solution. The pH of the solution is adjusted to a pH-value of 9.0 by the addition of a sodium hydroxide solution. The resulting alkaline solution is thoroughly extracted by means of chloroform. The chloroform extracts are washed with water, dried over magnesium sulfate, and evaporated to dryness in a vacuum. The residue is triturated with ethyl acetate, filtered with suction and dried. 12.1 g. (79% of the theoretical amount) of the crystalline lactone of 18β-hydroxy-17α-methoxy-16β-carboxy-2,3-seco-3-oxo-20α-yohimbane are obtained. The compound melts at 178° C. and has a specific rotary power $[\alpha]_D^{20}=-81°$ (concentration: 0.5% in ethanol). It is slightly soluble in ethyl acetate and soluble in chloroform.

*Analysis.*—$C_{21}H_{24}O_4N_2=368.0$: Calculated, 68.46% C; 6.7% H; 17.32% O; 7.8% N. Found, 68.4% C; 6.7% H; 17.6% O; 7.6% N.

This compound has not yet been described in the literature.

EXAMPLE 5

*Preparation of the Lactone of 18β-Hydroxy-17α-Methoxy-16β-Carboxy-20α-Yohimbene-$\Delta^{3(14)}$ (Formula VI)*

3 g. of the compound obtained according to Example 4 having a melting point of 178° C. and a specific rotatory power of $[\alpha]_D^{20}=-81°$, are suspended in 60 cc. of phosphorus oxychloride and boiled under reflux for 2 hours. The compound dissolves rapidly when the mixture starts to boil. After the reaction is completed, the phosphorus oxychloride is distilled off in a vacuum. The residue is taken up in 50 cc. of methanol. After cooling, the pH of the solution is adjusted to a pH-value of 9.0 by the addition of ammonia while cooling is continued. The precipitated crystals are filtered with suction, washed with water and with methanol, and dried. 2.3 g. (80% of the theoretical amount) of the lactone of 18β-hydroxy-17α-methoxy-16β-carboxy-20α - yohimbene-$\Delta^{3(14)}$ are obtained. The compound is sufficiently pure for use in the following reduction step. It is slightly soluble in acetone and very slightly soluble in methanol.

For analysis, the compound is recrystallized from acetone. It melts at 300° C. and has a specific rotatory power of $[\alpha]_D^{20}=+22°$ (concentration: 0.5% in dimethyl formamide).

*Analysis.*—$C_{21}H_{22}O_3N_2=350.40$: Calculated, 71.98% C; 6.33% H; 13.7% O; 8.0% N. Found, 72.0% C; 6.3% H; 13.9% O; 7.7% N.

This compound has not yet been described in the literature.

EXAMPLE 6

*Preparation of the Lactone of 18β-Hydroxy-17α-Methoxy-16β-Carboxy-3β,20α-Yohimbane (Formula VII)*

To a stirred mixture of 76 cc. of 95% acetic acid and 7.2 g. of zinc powder boiling under reflux there are added 1.9 of the crude unsaturated lactone prepared according to Example 5 within 10 minutes. Refluxing is continued for 5 minutes. The reaction mixture is cooled, poured on 300 g. of ice, and rendered alkaline by the addition of ammonia until a pH-value of 9.0 is obtained. The solution is extracted several times with a mixture of methylene chloride and ethanol (4:1). The organic solvent extracts are washed, dried over magnesium sulfate, filtered, and evaporated to dryness in a vacuum. The residue is recrystallized from ethyl acetate. The precipitated crystals are filtered with suction and dried. About 700 mg. of the lactone of 18β-hydroxy-17α-methoxy-16β-carboxy-3β,20α-yohimbane which has a melting point of 315° C. are obtained. After recrystallization, the compound melts at 330° C. and has a specific rotatory power of $[\alpha]_D^{20}=+12°$ (in chloroform).

*Analysis.*—$C_{21}H_{24}O_3N_2=352$: Calculated, 71.57% C; 6.86% H; 13.62% O; 7.95% N. Found: 71.6% C; 6.8% H; 13.6% O; 7.7% N.

This compound is identical with the lactone of deserpidic acid obtained from natural deserpidine by Schlittler et al., "Journ. Am. Chem. Soc.," vol. 77, page 4335 (1955).

The combined mother liquors are evaporated to dryness. The residue is dissolved in methylene chloride and passed through a chromatographic column of neutral alumina. By elution with methylene chloride, another crop of the lactone of deserpidic acid is obtained, thus rendering the yield 40% of the theoretical amount of the pure product.

When elution is continued with methylene chloride containing 0.5% of methanol, the 3α-isomeric lactone of deserpidic acid (Formula VIII) is obtained. After recrystallization from ethyl acetate and then from aqueous acetone, the compound has two melting points at 155° C. and 247° C., respectively. Its specific rotatory power is $[\alpha]_D = -135° \pm 5$ (concentration: 0.5% in chloroform). After drying at 100° C., in a vacuum, the compound is obtained in hygroscopic form.

*Analysis.*—$C_{21}H_{24}O_3N_2 = 352.4$: Calculated, 71.57% C; 6.86% H; 13.62% O; 7.95% N. Found, 71.0% C; 6.9% H; 14.6% O; 8.0% N.

This product has not yet been described.

EXAMPLE 7

*Preparation of 18β-Hydroxy-17α-Methoxy-16β-methoxy Carbonyl-3β,20α-Yohimbane (Methyl Ester of Deserpidic Acid) (Formula IX)*

570 mg. of the 3β-lactone of deserpidic acid, prepared according to Example 6, are suspended in 22 cc. of absolutely dry methanol. 3.3 cc. of methanol which contain 1 mg. of sodium metal per cc. are added. The mixture is refluxed for 2 hours. Dissolution of the starting material is finished when the mixture has boiled for a quarter of an hour. When the methanolysis is completed, most of the solvent is distilled off in a vacuum. The residue is dissolved in methylene chloride. The solution is washed with water, dried over magnesium sulfate, filtered, purified with charcoal, and evaporated to dryness. The resulting methyl ester of deserpidic acid is sufficiently pure for esterification to deserpidine according to the method described by Schlittler et al., "Journ. Am. Chem. Soc.," vol. 77, page 4335 (1955), i.e. by subjecting the methyl ester of deserpidic acid to the action of trimethoxy benzoyl chloride in pyridine at 5° C. for 5 days. On purification in the usual manner, deserpidine of a melting point of 235° C. and a specific rotatory power of $[\alpha]_D = -136° \pm 4$ (concentration: 0.5% in chloroform) is obtained.

I claim:
1. 3-Dehydro-isodeserpidic acid lactone of the formula

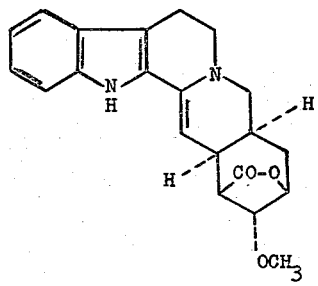

2. The dextrorotatory lactone of 18β-hydroxy-17α-methoxy-16β-carboxy-20α-yohimbene-Δ³⁽¹⁴⁾ substantially free of its optical antipode.

3. The method of preparing the 3-dehydro-iso-deserpidic acid lactone of the formula

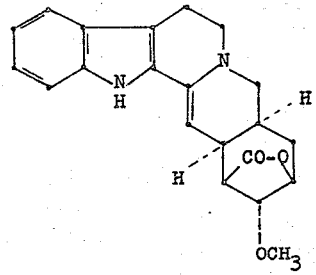

which comprises reacting the lactone of 18β-hydroxy-17α - methoxy - 3 - oxo - 16β - carboxy - 2,3 - seco - 20α-yohimbane with phosphorus oxychloride, dissolving the reaction product in an inert organic solvent, treating with concentrated ammonia and recovering said 3-dehydro-iso-deserpidic acid lactone.

4. The process for producing deserpidic acid lactone which comprises the step of (a) reacting tryptamine with the methyl ester of levorotatory 1β-carboxy methyl-2β-methoxy carbonyl-3α-methoxy-4β-acetoxy-6β - acetoxy - 6β - formyl cyclohexane in the presence of a neutral organic solvent, (b) reacting the resulting methyl ester of 18β-acetoxy-17α-methoxy-16β-methoxy carbonyl-2,3-3,4 - diseco-Δ⁴⁽²¹⁾-dehydro-20α-yohimbane-3-carboxylic acid with an alkali metal borohydride in the presence of an alcoholic solvent at the reflux temperature, (c) saponifying the resulting reaction product with an aqueous alcoholic alkali metal hydroxide at reflux temperature, (d) lactonizing the resulting dextrorotatory 18β-hydroxy-17α-methoxy-16β-carboxy-2,3-seco-3-oxo-20α-yohimbane by heating with acetic acid anhydride in the presence of lithium acetate, (e) cyclizing the resulting levorotatory lactone of 18β-hydroxy-17α-methoxy-16β-carboxy-2,3-seco - 3 - oxo-20α-yohimbane by heating at the reflux temperature with an agent selected from the group consisting of phosphorous oxychloride and thionylchloride, (f) dissolving the resulting reaction product in methanol and alkalizing with ammonia, (g) reducing the resulting lactone of 18β-hydroxy-17α-methoxy-16β-carboxy-Δ³⁽¹⁴⁾-dehydro-20α-yohimbane by the action of zinc and acetic acid at reflux temperature, and (h) recovering said deserpidic acid lactone by recrystallization from organic solvents.

References Cited in the file of this patent
UNITED STATES PATENTS 2,901,483   Kuehne _____ Aug. 25, 1959
2,977,365   Weisenborn et al. _____ Mar. 28, 1961

OTHER REFERENCES

Karrer: Organic Chemistry, 2nd ed. (1946), pages 92–102.
MacPhillamy et al.: Jour. Am. Chem. Soc., vol. 77, pages 4335 and 4338 (Aug. 20, 1955).
Bose et al.: Indian Jour. of Pharm., vol. 18, pages 185–187 (1956).
Woodward: Jour. Am. Chem. Soc., vol. 78, pages 2023–2025, May 5, 1956.

UNITED STATES PATENT OFFICE
CERTIFICATE OF CORRECTION

Patent No. 3,051,712                          August 28, 1962

Georges Muller

It is hereby certified that error appears in the above numbered patent requiring correction and that the said Letters Patent should read as corrected below.

Column 5, line 51, for "$C_{21}H_{26}O_6N_2$" read -- $C_{21}H_{26}O_5N_2$ --; column 6, line 6, for "rotary" read -- rotatory --; column 8, line 26, strike out "6$\beta$-acetoxy-".

Signed and sealed this 15th day of January 1963.

(SEAL)
Attest:

ERNEST W. SWIDER                          DAVID L. LADD
Attesting Officer                          Commissioner of Patents